United States Patent [19]

Komatsuzaki et al.

[11] Patent Number: 4,528,221
[45] Date of Patent: Jul. 9, 1985

[54] POLYSTYRENE FOAMED SHEET SUITABLE FOR FORMING

[75] Inventors: Nobuyuki Komatsuzaki; Masahiro Tsubone; Bon Machida, all of Koga, Japan

[73] Assignee: Sekisui Kaseihin Kogyo Kabushiki Kaisha, Nara, Japan

[21] Appl. No.: 493,290

[22] Filed: May 10, 1983

[30] Foreign Application Priority Data

May 11, 1982 [JP] Japan .................................. 57-79534

[51] Int. Cl.³ ..................... B32B 1/02; B32B 27/06; B32B 27/30
[52] U.S. Cl. ...................................... 428/35; 428/215; 428/220; 428/318.6; 428/319.9; 428/339; 428/910; 521/139
[58] Field of Search ............... 428/319.3, 319.7, 319.9, 428/35, 215, 219, 220, 318.6, 339, 910; 521/139

[56] References Cited

U.S. PATENT DOCUMENTS

| | | | |
|---|---|---|---|
| 3,619,344 | 11/1971 | Wolinski | 428/314.4 |
| 3,861,994 | 1/1975 | Stark | 428/314.8 |
| 4,011,357 | 3/1977 | Haase | 428/318.6 |
| 4,101,050 | 7/1978 | Buckler et al. | 428/319.9 |
| 4,426,065 | 1/1984 | Komatsuzaki et al. | 214/45.9 |
| 4,463,861 | 8/1984 | Tsubone et al. | 428/35 |

Primary Examiner—William J. Van Balen
Attorney, Agent, or Firm—Armstrong, Nikaido, Marmelstein & Kubovcik

[57] ABSTRACT

A polystyrene foamed sheet suitable for thermoforming and containers such as cups or trays formed therefrom, the foamed sheet comprising a polystyrene resin as the base resin which contains a specific quantity of each a rubber component and a filler, having specific bulk density, thickness, stretch ratio and residual gas quantity, and said sheet being preferably laminated with a film.

22 Claims, 7 Drawing Figures

POLYSTYRENE FOAMED SHEET SUITABLE FOR FORMING

BACKGROUND OF THE INVENTION

1. Field of the Invention

The present invention relates to a polystyrene foamed sheet suitable for forming. More particularly, it relates to a polystyrene foamed sheet stock to be used for making cups and other deeply drawn containers or for making trays and other thin-walled formings, said polystyrene foamed sheet stock is superior in formability and suitable for mass production.

2. Description of the Prior Art

One of the known methods for producing polystyrene foamed products employs an extruder. According to this method, a polystyrene resin composition and a blowing agent are extruded together by an extruder into a foamed sheet (sheet stock). The sheet is then heated above its softening point and formed into a desired shape using a mold. This forming method, however, suffers from several disadvantages. That is to say, the resulting formed part is poor in dimensional accuracy and stability (reproduction of mold) on account of the secondary foaming that takes place when the sheet is heated for forming. Such a formed part is not suitable for a lid that needs snug fitting. When heated for forming, the sheet cannot be drawn enough to be made into a cup and other deeply drawn containers. The forming cycle (time from sheet supply to demolding) is long. The resulting formed part is unduly bulky and takes a large volume when stacked.

The conventional method for continuously producing cuplike containers having a draw ratio greater than 1 from a polystyrene foamed sheet has another disadvantage. That is to say, it is necessary to juxtapose the molds with sufficient intervals, as shown in FIG. 3, because the elongation of the softened sheet is limited. (If sufficient intervals are not provided, the resulting formed part will break or decrease in strength.) The use of such a mold leads to poor productivity. It is desirable to produce as many formed parts as possible from a given sheet stock having a certain size. This is particularly important for the volume production of cuplike containers for instant foods (such as noodles).

Efforts have been made to improve the reproduction of mold and the formability by incorporating a filler and a rubber component into the foamed sheet. Such improvements, however, often caused breakage of sheet stock in the molding cycle and led to brittle products having low compression strength.

This invention has been completed in order to overcome the above-mentioned disadvantages. Accordingly, it is an object of this invention to provide a polystyrene foamed sheet suitable for forming. It is another object of this invention to provide a polystyrene foamed sheet stock which can be formed efficiently into deeply drawn containers.

The present inventors previously found that it is possible to form continuously trays and the like without performing aging of sheet, if the quantity of residual gas of blowing agent is controlled below 0.3 mole/kg at the time of sheet extrusion and foaming. (See U.S. Pat. No. 4,426,065.) The present invention is based on this finding, but a further improvement was made as the result of the studies carried out from a different point of view.

SUMMARY OF THE INVENTION

This invention relates to a polystyrene foamed sheet suitable for forming and containers obtained by forming such a sheet, said polystyrene foamed sheet comprising a polystyrene resin as the base resin which contains 1 to 30 wt% (based on polystyrene resin) of a rubber component and 1 to 20 wt% (based on polystyrene resin) of a filler, and having a bulk density of 0.13 to 0.7 g/cm$^3$, a thickness of 0.4 to 3.0 mm, and a stretch ratio less than 1.25 and a quantity of residual gas of a blowing agent less than 0.3 mole/kg, and optionally said foamed sheet having a 5 to 600-μm thick non-foamed resin film on at least one surface thereof.

DESCRIPTION OF THE PREFERRED EMBODIMENTS

Figure 1:
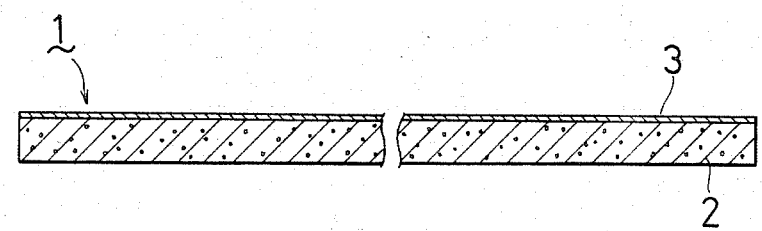
FIG. 1 is a sectional view of a polystyrene foamed sheet laminated with a resin film according to this invention.

FIG. 1 shows a sectional view of a polystyrene foamed sheet which is one of the preferred embodiments of this invention. The foamed sheet (1) is a 1 to 3-mm thick composite sheet made up of a sheetlike foam (2) composed chiefly of polystyrene resin and a non-foamed resin film (3) laminated by fusion bonding onto one surface of said sheetlike foam. The sheetlike foam (2) contains 1 to 30 wt% (based on polystyrene) of a rubber component and 1 to 20 wt% (based on polystyrene) of a filler. It has a bulk density of 0.13 to 0.7 g/cm$^3$ and a stretch ratio lower than 1.25. The quantity of residual gas of a volatile blowing agent in the sheetlike foam is controlled below 0.3 mole/kg. The non-foamed resin film (3) is a 5 to 600-μm thick thermoplastic resin film.

Figure 2:
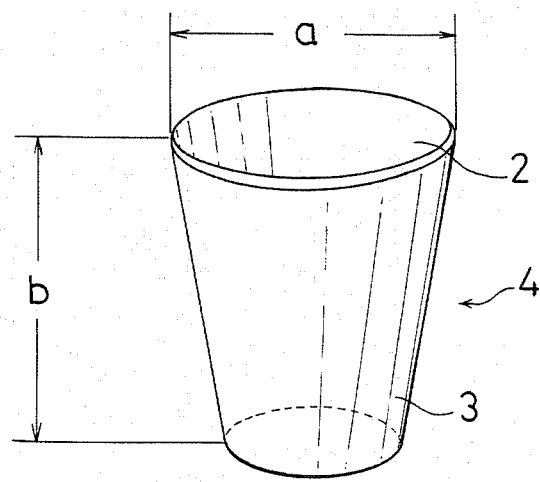
FIG. 2 is a perspective view of a cuplike formed part that can be efficiently produced from the polystyrene foamed sheet of this invention.
Figure 3:
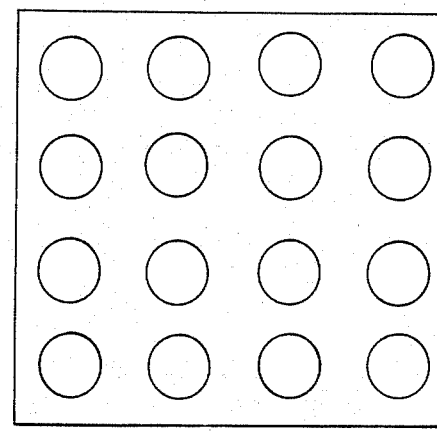
FIG. 3 is a schematic plan view of the conventional mold arrangement for forming cups.
Figure 4:
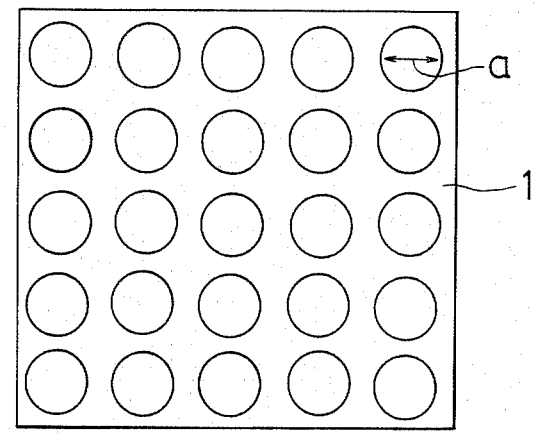
FIG. 4 is a schematic plan view of the mold arrangement for forming cups from the polystyrene foamed sheet of this invention.

The foamed sheet of this invention exhibits very good formability when used for deep drawing. It is particularly suitable for producing deeply drawn cuplike formed parts (4) having a desired strength and a draw ratio (b/a) greater than 1.0, as shown in FIG. 2. Moreover, the foamed sheet of this invention can be made into more formed parts than the conventional foamed sheet of the same size. For instance, if formed parts (4) like a cup measuring 92 mm in diameter and 105 mm in depth, as shown in FIG. 2, are to be produced from a conventional polystyrene sheet (1'; including one laminated with a non-foamed resin film) measuring 600 by 600 mm, the maximum number of parts that can be formed at one time would be 16 (4 by 4), as shown in FIG. 3. In contrast, it is possible to make 25 (5 by 5)

parts or more at one time, as shown in FIG. 4, if the foamed sheet of this invention is used.

The polystyrene resin constituting the polystyrene foamed sheet of this invention includes polymers made up of styrene-type vinyl monomers such as styrene, methylstyrene, and dimethylstyrene, and also includes copolymers made up of styrene-type vinyl monomers and other vinyl monomers such as acrylic acid, methacrylic acid or ester thereof, acrylonitrile, acrylamide, methacrylonitrile, and maleic anhydride.

These polymers should preferably have a weight-average molecular weight of $5 \times 10^4$ to $70 \times 10^4$ as measured by GPC method. One which is commonly used for extrusion molding can be used without restriction.

The polystyrene resin may be available in the form of powder, granule, or pellets, and also available as a compound containing a small quantity of slip agent and stabilizer. One having a melt index of 1.2 to 25 (as measured in accordance with JIS K6870) is suitable.

The polystyrene foamed sheet of invention can be prepared by extrusion-foaming the resin composition made up of a polystyrene resin and specific quantities of rubber component and filler.

The above-mentioned rubber component is contained as a blend component or copolymer component in an amount of 1 to 30 wt% based on the polystyrene resin. The rubber component used as a blend component includes butadiene rubber, ethylene-propylene rubber, styrene-butadiene rubber, and polyethylene. They are added to the polystyrene resin. The rubber component used as a copolymer component includes such monomers as butadiene, isoprene, and chloroprene and oligomers thereof. They are copolymerized at a predetermined molar ratio with polystyrene resin. (In the case where a copolymer is used as the polystyrene resin, the copolymer containing the rubber component becomes a terpolymer.)

If the content of the rubber component is less than 1 wt%, the resulting foamed sheet is not suitable for producing deeply drawn parts. Cups produced from such a sheet lack strength and are liable to break at the lip. Moreover, such a sheet is insufficient in elongation and in productivity. On the other hand, if the content of the rubber component exceeds 30 wt%, cells can't be independent and the formed parts produced therefrom become less stiff and generate bubbles when they are subjected to hot water. Moreover, the foamed sheet gives off an odor of rubber, and is not suitable for producing food containers. The preferred content of the rubber component is 1 to 20 wt%, more suitably 1 to 7 wt%.

The filler is effective in improving the appearance and the dimensional accuracy and stability of the formed part. If the content of the filler is less than 1 wt%, it is impossible to adequately control gas and cells, and consequently to control the thickness of the formed part. On the other hand, if the content of the filler exceeds 20 wt%, the resulting foamed sheet is insufficient in elongation at the time of forming, although it is possible to control gas and cells. The preferred content of the filler is 1.5 to 10 wt%.

The examples of the filler include talc, calcium carbonate, Shirasu (volcanic ash), gypsum, carbon black, white carbon, magnesium carbonate, clay, natural silica, and other common inorganic fillers and metal powder.

The thickness, bulk density, and draw ratio of the foamed sheet are controlled by the above-mentioned specific values.

If the thickness is less than 0.4 mm, the foamed sheet cannot be drawn deeply and the resulting formed part is insufficient in compression strength. If the thickness exceeds, 3 mm, the formability becomes poor; particularly it is difficult to balance the side wall thickness and the bottom wall thickness. The preferred thickness (including the non-foamed resin film) is 2 to 3 mm. The thickness can be controlled by adjusting the slit of the extrusion die.

The bulk density should be 0.13 to 0.7 g/cm$^3$. If it is higher than 0.7, more resin is required and more heat is required for forming, resulting in an extended forming cycle. On the other hand, if the bulk density is lower than 0.13, the foamed sheet is insufficient in strength and when its sheet is formed, the resultant tends to lack a dimensional accuracy. Usually, the preferred bulk density is 0.15 to 0.5 g/cm$^3$. The bulk density should be adjusted by changing the quantity of a blowing agent.

The stretch ratio should be lower than 1.25, if adequate formability is to be achieved. Orientation takes place when the foamed sheet is taken up under tension in extrusion molding. Biaxial orientation takes place in the case where a circular die is used. Uniaxial orientation is acceptable, but biaxial orientation is more suitable in view of the strength of the resulting formed parts.

The foamed sheet of this invention is produced by extrusion-foaming that employs a volatile blowing agent or a decomposition-type blowing agent. The examples of the volatile blowing agent include hydrocarbons having a boiling point of $-40°$ to $45°$ C., such as propane, butane, and pentane; and halogenated hydrocarbons having a boiling point of $-47°$ to $45°$ C., such as trichloromonofluoromethane, dichlorodifluoromethane, and 1,2-dichlorotetrafluoroethane; and mixtures thereof. The example of the decomposition-type blowing agent include organic blowing agents such as azodicarbonamide, dinitrosopentamethylene tetramine, and 4,4'-oxybis(benzenesulfonylhydrazide); and sodium bicarbonate and a combination of a bicarbonate and an organic acid (like citric acid) or a salt thereof. (They may be coated with liquid paraffin or other proper coating agent.) In some cases, carbon dioxide, nitrogen gas, or water may be used as a blowing agent. The blowing agent is introduced into the extruder in the usual way.

The quantity of residual gas of the blowing agent in the foamed sheet should be less than 0.3 mole/kg. If the quantity of residual gas is excessive, secondary foaming takes place when the sheet is heated for forming, and the resulting formed part is poor in the reproduction of mold. The preferred quantity of residual gas as measured immediately after sheet production is 0.03 to 0.3 mole/kg. The foamed sheet containing residual gas in such an amount does not require aging prior to forming. Therefore, both sheet extrusion and forming can be accomplished in line. This is economically preferable.

If the quantity of residual gas measured immediately after sheet production is in excess of 0.3 mole/kg, degassing should be performed by heating the sheet to 40° to 50° C. or by permitting the sheet to stand for a certain period of time.

In the case where a sheet stock for in-line forming is required, a volatile blowing agent should be added to polystyrene resin in an amount of 0.03 to 0.4 mole/kg, or a decomposition-type blowing agent (which generates 3 to 30 cc of gas per 100 mg of blowing agent)

should be added in an amount of 0.1 to 5 parts by weight for 100 parts by weight of polystyrene resin.

The polystyrene foamed sheet thus prepared provides satisfactory formed parts, because the quantity of blowing gas in cells is controlled and the pressure in cells does not become negative. Moreover, the polystyrene foamed sheet containing 1 to 20 wt% of filler is superior in the reproduction of mold in forming. Further, the polystyrene foamed sheet containing 1 to 30 wt% of rubber component is superior in elongation when heated for forming. These features and other conditions make the foamed sheet suitable for producing formed parts with improved formability.

In practical use, however, it is desirable to laminate a non-foamed resin film onto at least one surface of the foamed sheet in order to improve the elongation of the sheet at the time of forming and the compression strength of the resulting formed part. This non-foamed resin film is usually a 5 to 600-μm thick film of thermoplastic resin. This film may be laminated onto both surfaces of the foamed sheet.

The thermoplastic resin for the non-foamed film includes, for example, polystyrene, polyethylene, high-impact polystyrene which is a mixture or copolymer of polystyrene and rubber, polypropylene, and polyethylene terephthalate. Preferable among them from the standpoint of formability are high-density polyethylene, and high-impact polystyrene; and preferable among them from the standpoint of processability are polystyrene and high-impact polystyrene.

If the film thickness is less than 5 μm, the improvement in elongation is not satisfactory and the resulting formed part is not adequately improved in mechanical strength. If the film thickness exceeds 600 μm, the following disadvantage occurs. That is, when each formed part (such as a cup) is punched out from a formed sheet, the cells at the lip are collapsed and become open and the laminated film is peeled from the foamed sheet. Moreover, an excessively thick film is uneconomical. A preferable film thickness is 30 to 500 μm, if a formed part as shown in FIG. 2 is to be produced. Incidentally, this non-foamed film contributes to the printability and gas barrier properties of the resulting formed part.

The non-formed thermoplastic film can be laminated onto the foamed sheet in various ways. For instance, the thermoplastic film may be laminated onto the foamed sheet in the die by using a co-extrusion die (e.g., crosshead die). In the other way, the foamed sheet and the thermoplastic film extruded from the separate dies can be continuously laminated, or the previously extruded thermoplastic film can be laminated onto the foamed sheet. The lamination may be achieved with an adhesive or by fusion-bonding. A variety of adhesives may be used for lamination, e.g., EVA copolymer and SBR in the form of solution, emulsion, or film.

The polystyrene foamed sheet laminated with a non-foamed resin film prepared as mentioned above is advantageous in that the elongation of the foamed sheet at the time of heating is improved and the compression strength of the resulting formed part is also improved. Thus, it is useful as a sheet stock for forming various products that require high dimensional accuracy, particularly deeply drawn containers (having a draw ratio greater than 1), as shown in FIG. 2, that need high compression strength and sufficient elongation at the time of forming. In addition to the above-mentioned advantages, the foamed sheet of this invention is superior in productivity and therefore is useful as a sheet stock for volume production of formed parts.

The invention is now described in detail with reference to the following examples.

EXAMPLES 1 to 15 and COMPARATIVE EXAMPLES 1 to 3

Several kinds of polystyrene foamed sheets of this invention which vary in the content of rubber and filler, the expansion ratio, and the thickness of the non-foamed resin film, were prepared. Each sheet was cut to a size of 600 by 600 mm, and each cut sheet was formed into cups, 106 mm in diameter and 106 mm in depth, with a taper of 7 degrees, as shown in FIG. 2. 16 cups were formed at one time. The formability of the sheet was rated according to the following criteria.

O: No damage in the 16 cups formed at one time.
Δ: One cup was damaged in the 16 cups formed at one time.
X: Two or more cups were damaged in the 16 cups formed at one time.

The lip strength of cups was rated according to the following criteria.

O: The cup did not break when the lip of the horizontally placed cup was compressed by 25%.
X: The cup broke when the lip of the horizontally placed cup was compressed by 25%.

The overall rating is based on the rating of formability and lip strength.

The foamed sheets were laminated on one surface with a non-foamed resin film by fusion bonding (Ex. 1–9 and 12–15) or by using co-extrusion die (Ex. 11 and 12).

The results are shown in Table 1.

TABLE 1

|  | Comp. Ex. 1 | Examples | | | | | | | |
|---|---|---|---|---|---|---|---|---|---|
|  |  | 1 | 2 | 3 | 4 | 5 | 6 | 7 | 8 |
| Formulation | | | | | | | | | |
| Foamed sheet (parts by weight) | | | | | | | | | |
| Polystyrene | 100 | 100 | 100 | 100 | 100 | 100 | 100 | 100 | 100 |
| Butadiene rubber | 0 | 1.5 | 3 | 15 | 20 | 30 | 3 | 3 | * |
| Filler (talc) | 2 | 2 | 5.2 | 6.5 | 6.5 | 15 | 3 | 15 | 5.2 |
| Stretch ratio (width) | 1.02 | 1.00 | 1.05 | 1.05 | 1.11 | 1.16 | 1.11 | 1.10 | 1.14 |
| Film (parts by weight) | | | | | | | | | |
| Polystyrene | 100 | 100 | 100 | 100 | 100 | 100 | 100 | 100 | 100 |
| Butadiene rubber | 3 | 3 | 3 | 1.5 | 3 | 3 | 1.5 | 1.5 | ** |
| Product spec. | | | | | | | | | |
| Foamed sheet | | | | | | | | | |
| Thickness (mm) | 2.7 | 2.0 | 2.1 | 2.2 | 2.3 | 2.1 | 2.2 | 2.5 | 2.6 |
| Expansion ratio | 9.5 | 7.0 | 7.0 | 7.7 | 6.0 | 7.4 | 6.6 | 5.8 | 6.8 |
| Film | | | | | | | | | |

TABLE 1-continued

| | | | | | | | | | |
|---|---|---|---|---|---|---|---|---|---|
| Thickness (μm) | 200 | 200 | 200 | 210 | 400 | 500 | 100 | 100 | 200 |
| Residual gas (mole/kg) | 0.45 | 0.27 | 0.23 | 0.20 | 0.18 | 0.14 | 0.21 | 0.12 | 0.14 |
| Molding conditions | | | | | | | | | |
| Cycle (sec) | 8 | 8 | 8 | 7 | 10 | 12 | 7 | 8 | 8 |
| Oven temp. (°C.) | 230 | 200 | 200 | 200 | 220 | 230 | 190 | 210 | 210 |
| Performance of cup | | | | | | | | | |
| Moldability | Δ | O | O | O | O | O | O | O | O |
| Lip strength | X | O | O | O | O | O | O | O | O |
| Overall rating | X | O | O | O | O | O | O | O | O |

| | Comp. Ex. 2 | Comp. Ex. 3 | Examples | | | | | | |
|---|---|---|---|---|---|---|---|---|---|
| | | | 9 | 10 | 11 | 12 | 13 | 14 | 15 |
| Formulation | | | | | | | | | |
| Foamed sheet (parts by weight) | | | | | | | | | |
| Polystyrene | 100 | 100 | 100 | 100 | 100 | 100 | 100 | 100 | 100 |
| Butadiene rubber | 0 | 0 | 1.0 | 1.5 | 3.0 | 6.5 | 6.5 | 30 | * |
| Filler (talc) | 2 | 5 | 5 | 10 | 10 | 10 | 15 | 15 | 10 |
| Stretch ratio (width) | 0.98 | 1.02 | 1.03 | 1.22 | 1.00 | 1.11 | 1.15 | 1.19 | 1.11 |
| Film (parts by weight) | | | | | | | | | |
| Polystyrene | 100 | 100 | 100 | 100 | 100 | 100 | 100 | 100 | 100 |
| Butadiene rubber | 3 | 6 | 6 | 3 | 3 | ** | 3 | 3 | 3 |
| Product spec. | | | | | | | | | |
| Foamed sheet | | | | | | | | | |
| Thickness (mm) | 2.2 | 2.0 | 2.0 | 1.2 | 2.1 | 2.1 | 2.1 | 1.5 | 2.1 |
| Expansion ratio | 11.6 | 8.4 | 5.3 | 6.3 | 7.4 | 6.7 | 5.5 | 7.9 | 6.3 |
| Film | | | | | | | | | |
| Thickness (μm) | 100 | 150 | 150 | 10 | 5 | 200 | 250 | 150 | 200 |
| Residual gas (mole/kg) | 0.60 | 0.35 | 0.19 | 0.17 | 0.18 | 0.16 | 0.12 | 0.14 | 0.15 |
| Molding conditions | | | | | | | | | |
| Cycle (sec) | 8 | 7 | 8 | 7 | 8 | 8 | 8 | 7 | 8 |
| Oven temp. (°C.) | 150 | 190 | 200 | 150 | 150 | 210 | 210 | 140 | 210 |
| Performance of cup | | | | | | | | | |
| Moldability | O | Δ | O | O | O | O | O | O | O |
| Lip strength | X | X | O | O | O | O | O | O | O |
| Overall rating | X | X | O | O | O | O | O | O | O |

Note:
*10 parts of polyethylene in place of butadiene rubber.
**5 parts of ethylene-vinyl acetate copolymer.

EXAMPLES 16 to 20

Evaluation tests were carried out in the same way as in the previous exmaples 1 to 15, except that the foamed sheet was laminated on both sides with non-foamed films. The results are shown in Table 2.

In the table, "Outside" and "Inside" of film mean respectively the films which constitute the outside and inside of the formed cup. The parenthesized numbers in the rows of "Outside" and "Inside" indicate the thickness of the adhesive layer of ethylene-vinyl acetate copolymer used for lamination, except in Examples 16 and 20 in which high-impact polystyrene film (outside) was fusion-bonded.

TABLE 2

| | Examples | | | | |
|---|---|---|---|---|---|
| | 16 | 17 | 18 | 19 | 20 |
| Formulation | | | | | |
| Foamed sheet (parts by weight) | | | | | |
| Polystyrene | 100 | 100 | 100 | 100 | 100 |
| Butadiene rubber | 1.5 | 30 | 20 | 30 | 30 |
| Filler (talc) | 2.0 | 2.0 | 15 | 20 | 20 |
| Stretch ratio (width) | 1.00 | 1.11 | 1.15 | 1.19 | 1.04 |
| Film (parts by weight) | | | | | |
| Outside | HIPS | PP | PP | PP | HIPS |
| Inside | LDPE | LDPE | LDPE | PP | PP |
| Product spec. | | | | | |
| Foamed sheet | | | | | |
| Thickness (mm) | 2.0 | 2.1 | 2.5 | 2.1 | 2.1 |
| Expansion ratio | 7.0 | 7.0 | 5.8 | 7.4 | 8.0 |
| Film thickness (μm) | | | | | |
| Outside | 160 | 40 (30) | 40 (15) | 40 (15) | 600 |
| Inside | 40 (35) | 130 (35) | 50 (15) | 400 (35) | 50 (35) |
| Residual gas (mole/kg) | 0.27 | 0.23 | 0.12 | 0.13 | 0.14 |
| Molding conditions | | | | | |
| Cycle (sec) | 8 | 8 | 8 | 18 | 14 |
| Oven temp. (°C.) | 200 | 210 | 220 | 250 | 240 |
| Performance of cup | | | | | |
| Moldability | O | O | O | O | O |
| Lip strength | O | O | O | O | O |
| Overall rating | O | O | O | O | O |

Note:
HIPS...High-impact polystyrene
LDPE...Low-density polyethylene
PP...Polypropylene EXAMPLES 21 to 28 and COMPARATIVE EXAMPLES 4 to 7

Different kinds of polystyrene foamed sheets of this invention were prepared by extruding a mixture of rubber-containing polystyrene resin and filler. During extrusion, butane (blowing agent) was injected into the melt state. Some of the foamed sheet were then laminated with non-foamed films.

Figure 5:
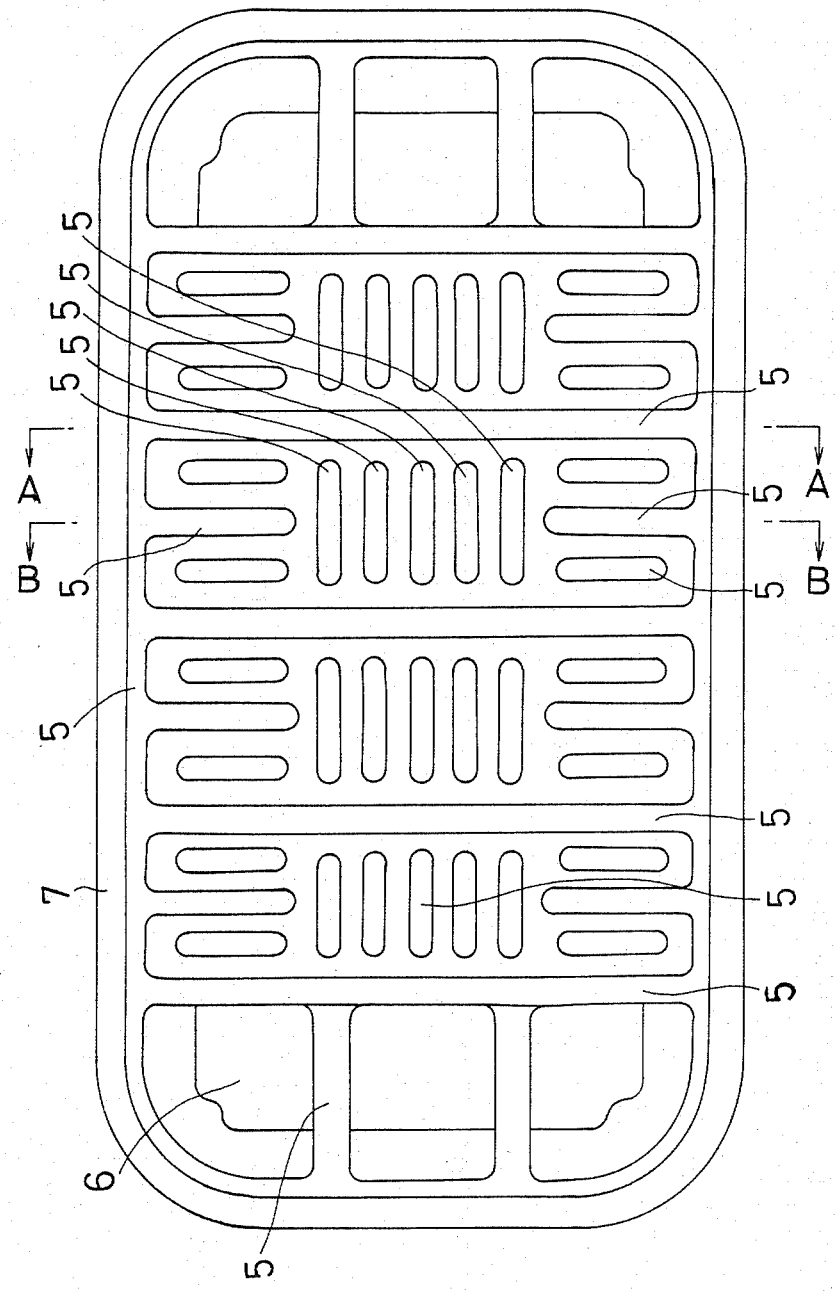
FIG. 5 is a plan view of a traylike formed part that can be efficiently produced from the polystyrene foamed sheet of this invention.
Figure 6:
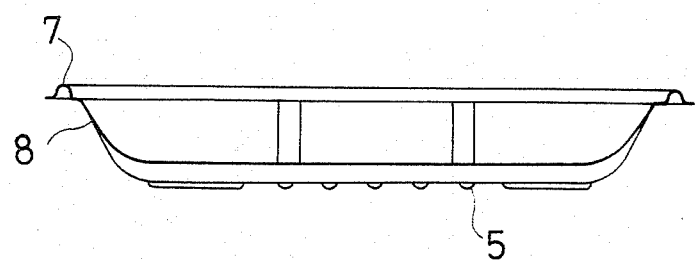
FIG. 6 is a section view taken along the line A—A of FIG. 5.
Figure 7:
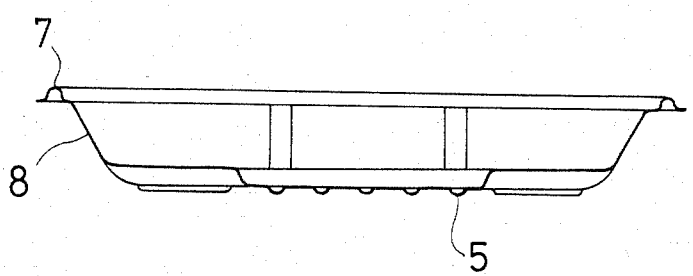
FIG. 7 is a section view taken along the line B—B of FIG. 5.

The resulting sheet was heated to 170° C. in an oven and then pressed using a forming die to give a tray (measuring 195×103×19 mm) as shown in FIGS. 5, 6 and 7. The results are shown in Table 3.

The formability of the sheet was rated according to the following criteria.

⊚ : Excellent
O: Good
Δ: Partially poor
X: Poor

In these examples, composite sheets 1 to 3 were prepared by fusion-bonding high-impact polystyrene films (about 24 μm thick) to both sides of the foamed sheet. Composite sheet 4 was prepared by bonding a polypropylene film (22 μm thick) with polyvinyl acetate to one side of the foamed sheet. Composite film 5 was prepared by bonding a low-density polyethylene film with polyvinyl acetate to one side of the foamed sheet.

In FIGS. 5 and 6, reference numerals 5, 6, 7, and 8 denote ribs, the bottom wall, the brim, and the side wall, respectively.

What we claim is:

1. A polystyrene foamed sheet comprising a polystyrene resin as the base resin which contains 1 to 30 wt% of a rubber component and 1 to 20 wt% of a filler based on said polystyrene, having a bulk density of 0.13 to 0.7 g/cm$^3$, a thickness of 0.4 to 3.0 mm, a stretch ratio less than 1.25 and a quantity of residual gas of a blowing agent less than 0.3 mole/kg, said foamed sheet being laminated with a non-foamed film on at least one surface thereof.

2. A polystyrene foamed sheet of claim 1, in which the quantity of the rubber component is 1 to 20 wt%.

3. A polystyrene foamed sheet of claim 1, in which the quantity of the rubber component is 1 to 7 wt%.

4. A polystyrene foamed sheet of claim 1, in which the quantity of the filler is 1.5 to 10 wt%.

5. A polystyrene foamed sheet of claim 1, in which the quantity of the residual gas is 0.03 to 0.3 mole/kg.

6. A container formed of a polystyrene foamed sheet, said polystyrene foamed sheet comprising a polystyrene resin as the base resin which contains 1 to 30 wt% of a

TABLE 3

| | Examples | | | | | | | |
|---|---|---|---|---|---|---|---|---|
| | 21 | 22 | 23 | 24 | 25 | 26 | 27 | 28 |
| Formulation | | | | | | | | |
| Polystyrene foamed sheet | PS sheet | PS sheet | PS sheet | Composite sheet 1 | Composite sheet 2 | Composite sheet 3 | Composite sheet 4 | Composite sheet 5 |
| Talc in foamed sheet (wt %) | 5 | 10 | 20 | 5 | 10 | 20 | 10 | 20 |
| Rubber in polystyrene (wt %)* | 2 | 2 | 2 | 1.5 | 1.5 | 1.5 | 1.5 | 1.5 |
| Properties of foamed sheet | | | | | | | | |
| Basis weight (g/m$^2$) | 193 | 192 | 191 | 24/150/25 | 23/153/24 | 24/151/25 | 162/10/20 | 163/13/20 |
| Thickness (mm) | 0.85 | 0.8 | 0.8 | 0.95 | 0.9 | 0.9 | 0.95 | 0.9 |
| Bulk density (g/cm$^3$) | 1/4.6 | 1/4.4 | 1/4.4 | 1/5.0 | 1/4.7 | 1/4.7 | 1/5.2 | 1/4.9 |
| Residual gas (mole/kg) | 0.18 | 0.16 | 0.14 | 0.15 | 0.13 | 0.11 | 0.11 | 0.14 |
| Stretch ratio (width) | 1.18 | 1.19 | 1.22 | 1.25 | 1.22 | 1.23 | 1.25 | 1.23 |
| Formability of sheet | | | | | | | | |
| Molding accuracy | 2.5/1000 | 1.5/1000 | 0.9/1000 | 2.7/1000 | 2.2/1000 | 1.5/1000 | 1.9/1000 | 1.6/1000 |
| Cycle (sec) at 170° C. | 5–9 | 5–9 | 5.5–9 | 6–10 | 6–10 | 6.5–10 | 7–11 | 5–8.5 |
| Stiffness (g) | 285 | 295 | 300 | 305 | 310 | 315 | 275 | 275 |
| Appearance | O | | | O | | | | — |
| Rating | | | | | | | | |
| Dimensional accuracy | O | | O | O | O | O | O | O |
| Forming | O | O | O | O | O | O | O | O |
| Appearance | O | O | O | O | O | O | O | O |
| Overall rating | O | O | O | O | O | O | O | O |

Note:
*High-impact polystyrene containing 20 wt % of rubber was added.

| | | Comparative Examples | | | |
|---|---|---|---|---|---|
| | | 4 | 5 | 6 | 7 |
| | Formulation | | | | |
| | Polystyrene foamed sheet | PS sheet | PS sheet | PS sheet | Composite sheet 1 |
| | Talc in foamed sheet (wt %) | 2 | 3 | 45 | 45 |
| | Rubber in polystyrene (wt %)* | 0.2 | 0.2 | 0.2 | 0 |
| | Stretch ratio (width) | 1.16 | 1.19 | 1.23 | 1.25 |
| | Properties of foamed sheet | | | | |
| | Basis weight (g/m$^2$) | 195 | 190 | 191 | 23/158/25 |
| | Thickness (mm) | 0.85 | 0.8 | 0.8 | 0.9 |
| | Bulk density (g/cm$^3$) | 1/4.6 | 1/4.4 | 1/4.9 | 1/4.7 |
| | Residual gas (mole/kg) | 0.21 | 0.19 | 0.10 | 0.05 |
| | Formability of sheet | | | | |
| | Molding accuracy | 7.7/1000 | 5.5/1000 | 1.5/1000 | 1.9/1000 |
| | Cycle (sec) at 170° C. | 4.5–8.5 | 4.5–8.5 | very narrow | 9.5–10 |
| | Stiffness (g) | 265 | 275 | 270 | 300 |
| | Appearance | X | Δ | ** | Δ |
| | Rating | | | | |
| | Dimensional accuracy | X | X | O | O |
| | Forming | O | O | X | Δ |
| | Appearance | X | Δ | X | Δ |
| | Overall rating | X | X | X | X |

Note:
*One parts by weight of high-impact polystyrene containing 20 wt % of rubber was added to 100 parts by weight of polystyrene.
**Good forming was impossible, and the appearance was poor.

rubber component and 1 to 20 wt% of a filler based on said polystyrene, having a bulk density of 0.13 to 0.7 g/cm³, a thickness of 0.4 to 3.0 mm, a stretch ratio less than 1.25 and a quantity of residual gas of a blowing agent less than 0.3 mole/kg.

7. A container formed of a laminate of a polystyrene foamed sheet and a non-foamed film laminated on at least one surface of the polystyrene foamed sheet, said polystyrene foamed sheet comprising a polystyrene resin as the base resin which contains 1 to 30 wt% of a rubber component and 1 to 20 wt% of a filler based on said polystyrene, having a bulk density of 0.13 to 0.7 g/cm³, a thickness of 0.4 to 3.0 mm, a stretch ratio less than 1.25 and a quantity of residual gas of a blowing agent less than 0.3 mole/kg.

8. The container of claim 6 or 7, in which the quantity of the rubber component in the polystyrene foamed sheet is 1 to 20 wt%.

9. The container of claim 6 or 7, in which the quantity of the rubber component in the polystyrene foamed sheet is 1 to 7 wt%.

10. The container of claim 6 or 7, in which the quantity of the filler in the polystyrene foamed sheet is 1.5 to 10 wt%.

11. The container of claim 6 or 7, in which the quantity of the residual gas is 0.03 to 0.3 mole/kg.

12. The container of claim 7, in which the non-foamed film has a thickness of 5–600 μm.

13. The container of claim 7, in which the non-foamed film is polystyrene, polyethylene, high-impact polystyrene, polypropylene or polyethylene terephthalate.

14. The container of claim 7, in which the non-foamed film is polystyrene or high-impact polystyrene.

15. A polystyrene foamed sheet comprising a polystyrene resin as the base resin which contains 1 to 30 wt% of a rubber component and 1 to 20 wt% of a filler based on said polystyrene, having a bulk density of 0.13 to 0.7 g/cm³, a thickness of 0.4 to 3.0 mm, a stretch ratio lss than 1.25 and a quantity of residual gas of a blowing agent less than 0.3 mole/kg.

16. A polystyrene foamed sheet of claim 15, in which the quantity of the rubber component is 1 to 20 wt%.

17. A polystyrene foamed sheet of claim 15, in which the quantity of the rubber component is 1 to 7 wt%.

18. A polystyrene foamed sheet of claim 15, in which the quantity of the filler is 1.5 to 10 wt%.

19. A polystyrene foamed sheet of claim 15, in which the quantity of the residual gas is 0.03 to 0.3 mole/kg.

20. A polystyrene foamed sheet of claim 1, in which the non-foamed film has a thickness of 5–600 μm.

21. A polystyrene foamed sheet of claim 1, in which the non-foamed film is polystyrene, polyethylene, high-impact polystyrene, polypropylene or polyethylene terephthalate.

22. A polystyrene foamed sheet of claim 1, in which the non-foamed film is polystyrene or high-impact polystyrene.

* * * * *